FIG. II

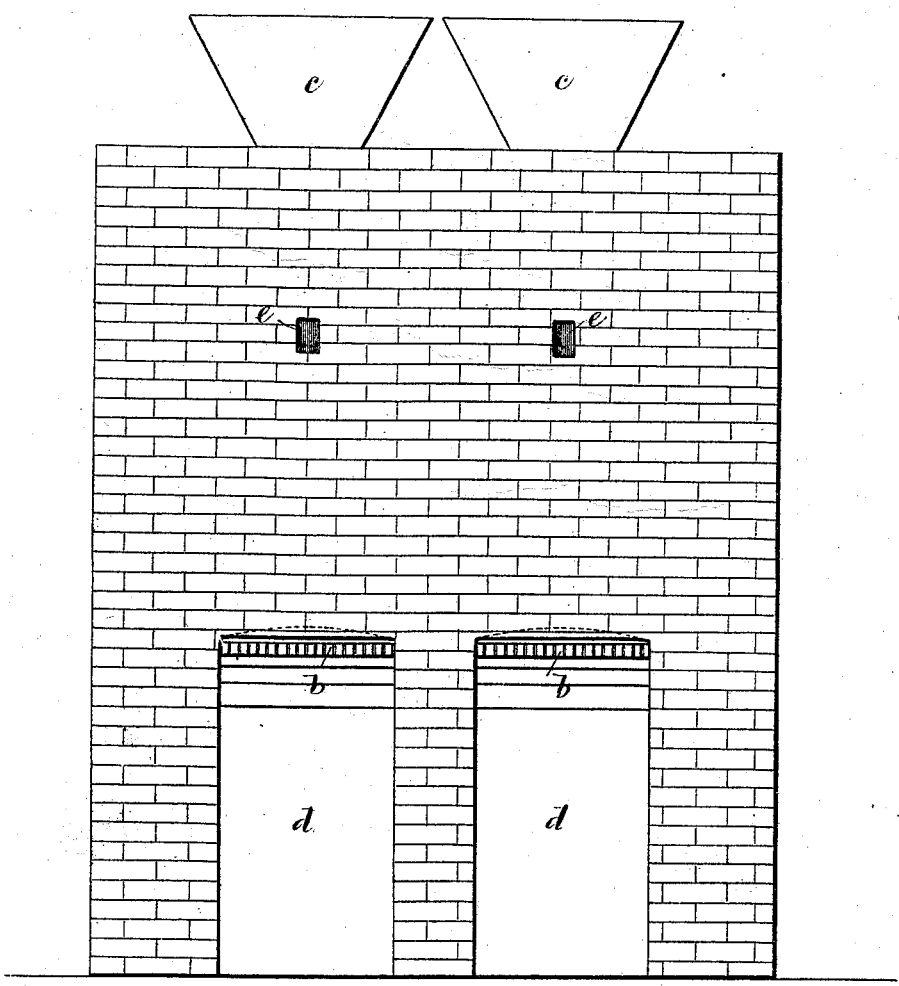

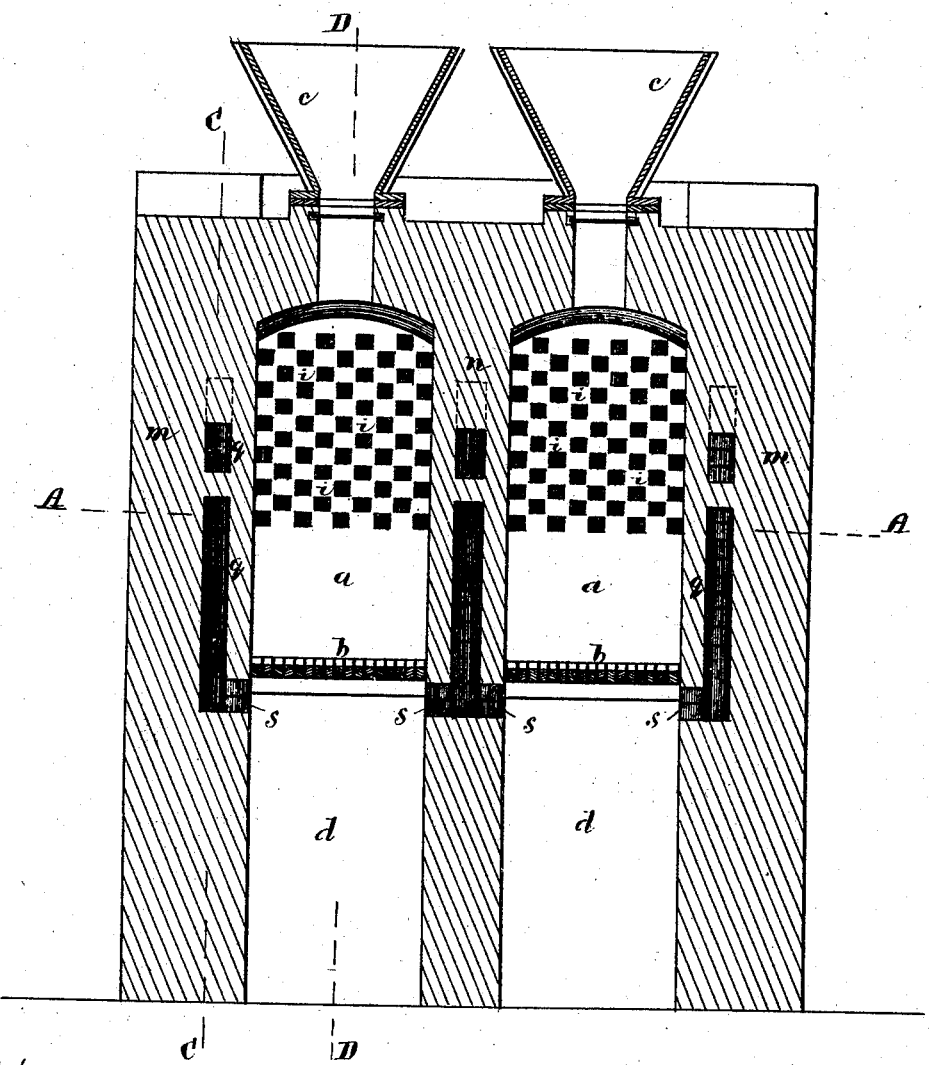

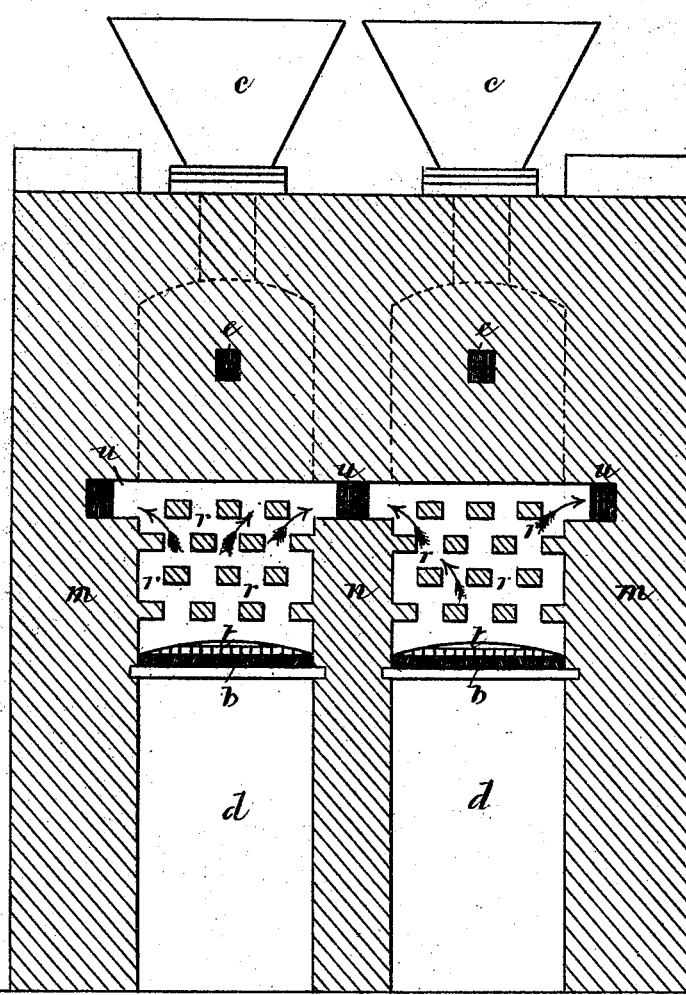

9 Sheets—Sheet 5.
A. PARKES.
GAS-FURNACE.
No. 171,162.        Patented Dec. 14, 1875.
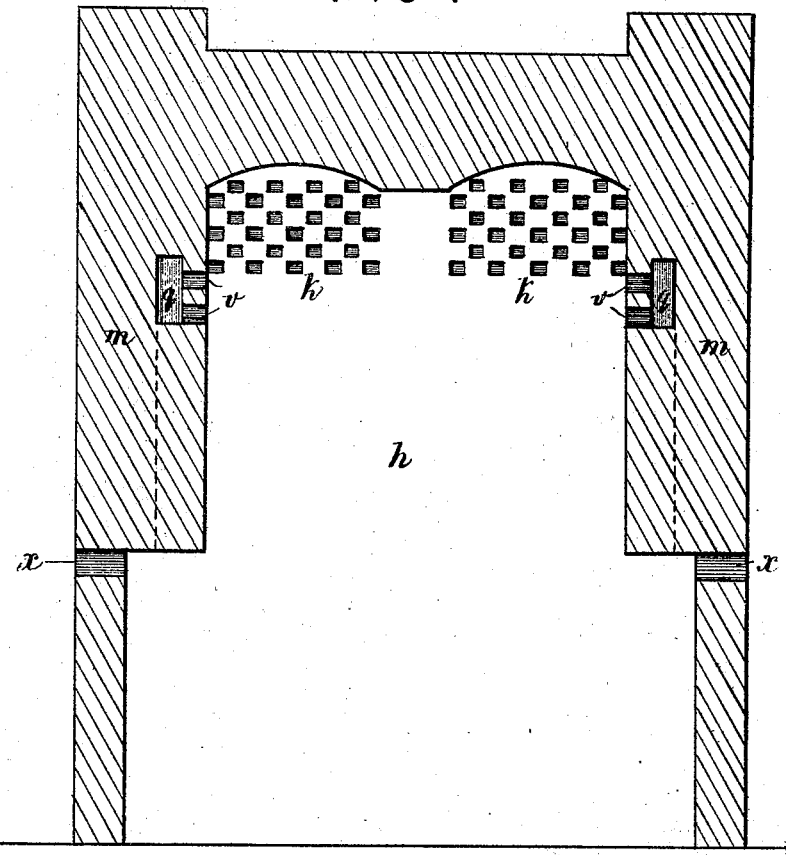

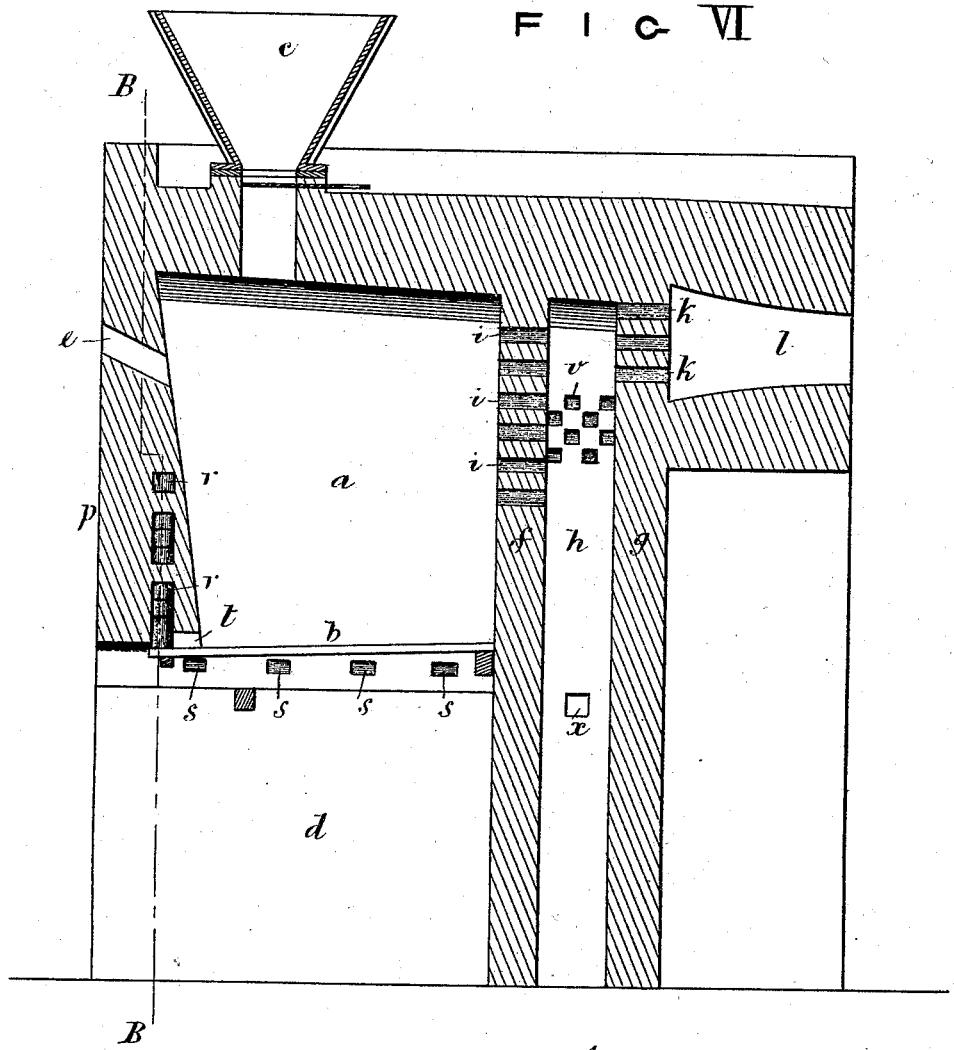

9 Sheets—Sheet 7.
A. PARKES.
GAS-FURNACE.
No. 171,162. Patented Dec. 14, 1875.
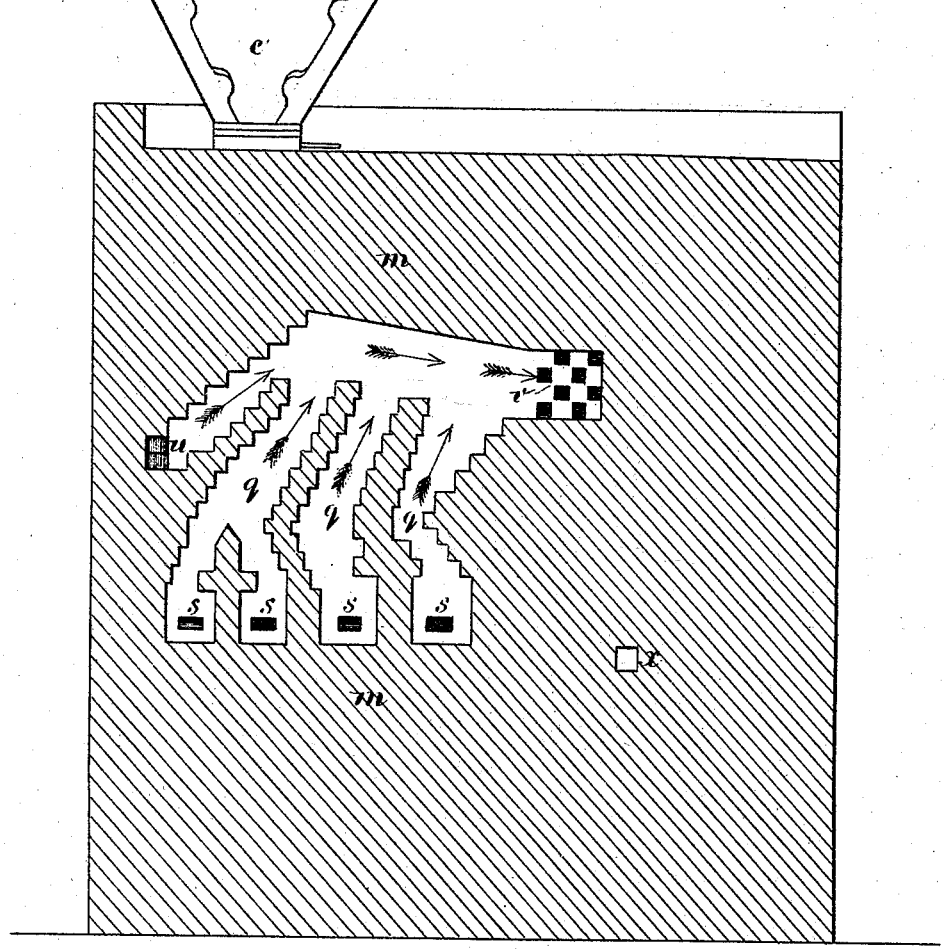

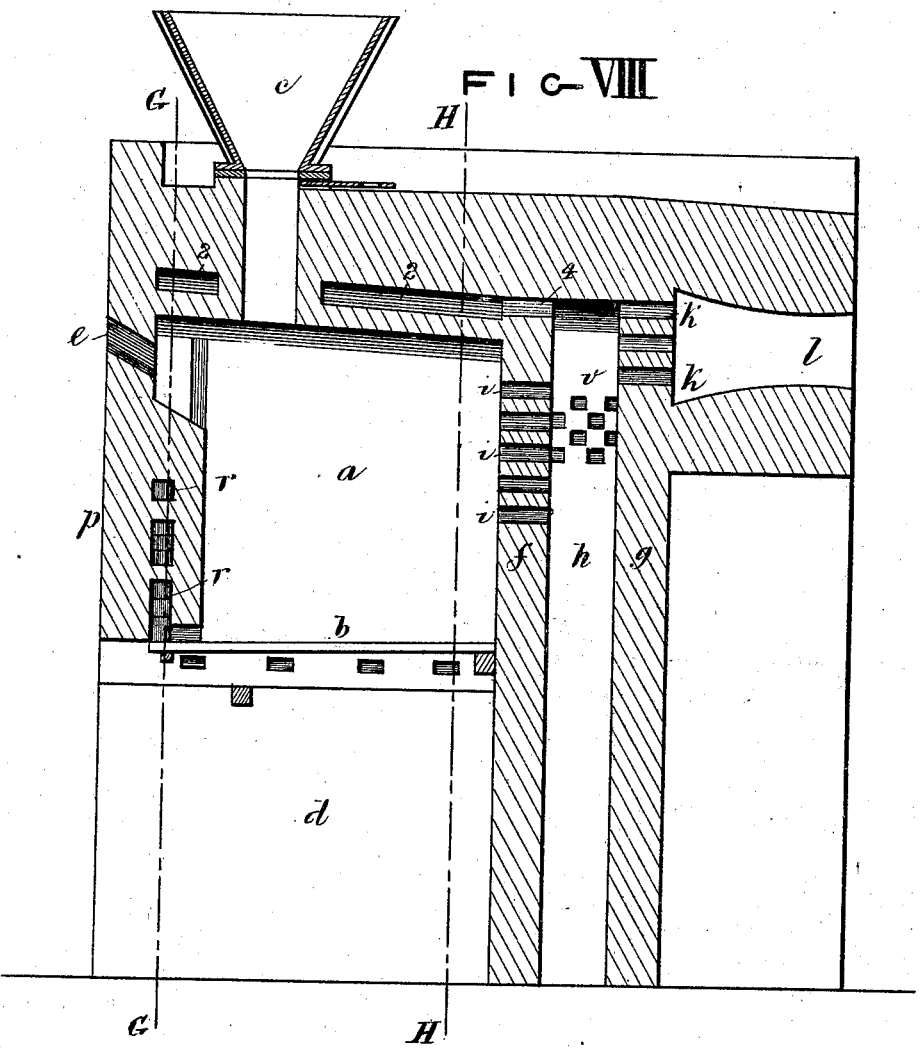

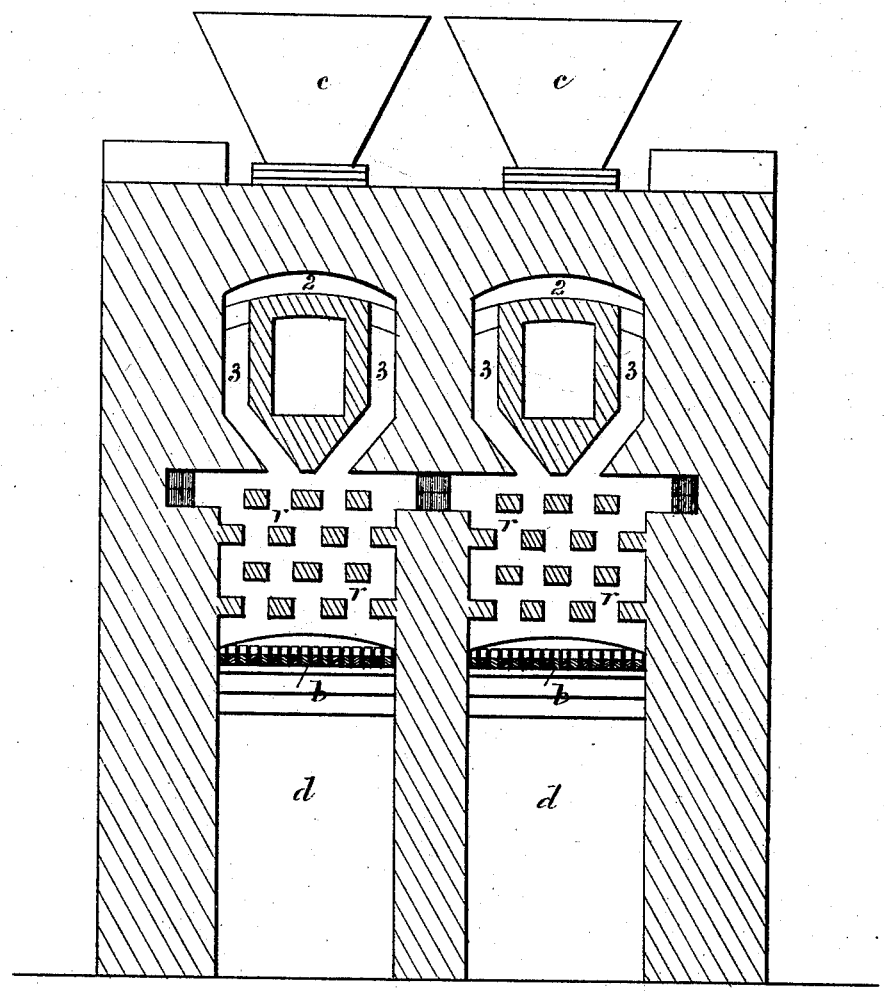

UNITED STATES PATENT OFFICE.

ALEXANDER PARKES, OF GRAVELLY HILL, ERDINGTON, ENGLAND.

IMPROVEMENT IN GAS-FURNACES.

Specification forming part of Letters Patent No. 171,162, dated December 14, 1875; application filed November 4, 1875.

*To all whom it may concern:*

Be it known that I, ALEXANDER PARKES, of Gravelly Hill, Erdington, in the county of Warwick, England, manufacturer, have invented Improvements in Furnaces for Metallurgical Operations, which improvements may also be applied to steam-boiler and other furnaces, of which the following is a specification:

My said invention consists of the improvements in furnaces hereinafter described, which said improvements are especially applicable to furnaces used in metallurgical operations— such, for example, as muffles, smelting, calcining, and puddling furnaces, but are also applicable to steam-boiler and other furnaces.

I will describe my invention in its application to a furnace for smelting copper. The chamber or generator into which the fuel is charged, and in which the gaseous fuel is produced, is provided with inclined bars at bottom, which may be tubular, and their inner ends open into the hollow bridge or combustion-chamber. Through the bars at the bottom of the generator air is supplied to the burning fuel, but in such quantity only as will suffice to maintain a low combustion, and give rise to the formation of a gaseous fuel, consisting essentially of carbonic oxide. The rear side of the generator is inclined, and the door or hopper through which the said generator is charged is at the top and over the inclined rear side of the said generator. The gaseous fuel produced passes from the generator at the side opposite to the inclined rear side described. I prefer to employ two or more of the said generators side by side, their gaseous products passing over a bridge common to them both into the reverberatory chamber. The bridge referred to is hollow, and constitutes a hot-air flue, up which a current of hot air rises. This hot air mixes with the gaseous fuel from the generators, thereby effecting its combustion, and producing an intense heat in the reverberatory chamber. The walls of the generator are reticulated or honey-combed, and the air passing up the hollow bridge is heated by passing through the reticulations in the said walls. In advance of the reverberatory chamber, in which the smelting of copper, the puddling of iron, or such other metallurgical process is conducted as requires a reverberatory furnace, a second chamber is situated, and separated from the furnace by a bridge. The flame and heated air from the reverberatory chamber pass into this second chamber, which is sufficiently heated thereby for conducting the process called cementation, or other metallurgical process, such as the distillation of zinc, requiring a less intense heat than that of the first or smelting chamber. The flame and heated air passing from the second or cementation chamber may pass to a Cornish or flue boiler, or other boiler, and by being made to circulate in and about the said boiler may be utilized for the production of steam.

In order to render the steam-boiler independent of the metallurgical furnace it may be provided with a small separate generator, of the kind described, which can be used for raising steam when the metallurgical furnace is not at work. The generator and hot-air reticulations and bridge may be applied to steam-boiler and other furnaces directly— that is, independently of a metallurgical furnace.

Having explained the nature of my invention, I will proceed to describe, with reference to the accompanying drawings, the manner in which the same is to be performed.

Figure 1 represents an end elevation, Fig. 2 a horizontal section, Figs. 3, 4, and 5 transverse vertical sections, and Figs. 6 and 7 longitudinal vertical sections, of a furnace to be applied to the smelting of copper, the puddling or melting of iron or steel, and to other like metallurgical operations; and also to the heating of steam-boilers, the said furnace being constructed according to my invention.

In the drawing the reverberatory or other chamber in connection with the furnace is omitted. The section, Fig. 3, is taken on the line I I, Fig. 2. The section, Fig. 4, is taken on the line B B, Figs. 2 and 6; and the section, Fig. 5, is taken on the line E E, Fig. 2. The horizontal section, Fig. 2, is taken on the line A A, Fig. 3. The longitudinal vertical section, Fig. 6, is taken on the line D D, Fig. 3; and the longitudinal vertical section, Fig. 7, is taken on the line C C, Fig. 3.

The same letters of reference indicate the same parts in the several figures of the drawings.

The furnace represented is provided with two chambers or gas-generators, marked $a\,a$, placed side by side; but one or more than two generators may be employed for each furnace. Into the said generators $a\,a$ the solid fuel is delivered in such quantity only as to fill half the fuel-space of the generator; and in the said generators the gaseous fuel, consisting mainly of carbonic oxide, is produced. The fuel supplied to the generators rests upon the inclined fire-bars $b$ at the bottom thereof; and fuel is supplied to the generators by the hoppers $c\,c$, situated over the arched tops of the said generators; or the fuel may be fed to the generators by a door at the rear side thereof, in a manner similar to that by which the fuel is fed to ordinary furnaces. $d\,d$ are the ash-pits. A limited quantity of air (regulated by doors, slides, or dampers) is supplied from the ash-pits $d\,d$ to the gas-generators $a\,a$ through the fire-bars $b\,b$, for maintaining in the generators a low combustion, and the production of gaseous fuel, as is well understood. The rear wall or side $p$ of each chamber or generator $a$ is inclined, as seen in Fig. 6. In the said rear wall of the generators are sight-holes $e\,e$, through which the state of the furnace may be ascertained.

The gaseous fuel from the generators $a\,a$ passes over or through a double or hollow bridge, marked $f\,g$, the space $h$ between the double bridge constituting a hot-air flue, up which hot air rises, and, mixing with the gaseous fuel, causes its combustion.

The wall $f$ of the hot-air flue or combustion-chamber $h$ is perforated with a series of rectangular openings, $i\,i$, through which the gaseous fuel from the generators $a\,a$ passes into the hot-air flue or combustion-chamber $h$, the flame, and heated air, and products of combustion from which chamber $h$ pass, by the perforations at $k$ in the other wall $g$, into the passage $l$, the mouth of which is contracted, as represented, for the purpose of concentrating the heat. This contracted passage is in communication with the reverberatory chamber or furnace, in which the copper to be smelted or the iron to be puddled or heated is placed. Or the said passage $l$ may communicate directly with a steam-boiler or other vessel to be heated. As the reverberatory or other chamber constitutes no part of my invention, I have not represented the said chamber in connection with the furnace now being described.

By the combustion of the gaseous fuel in the hot-air flue or chamber $h$ an intense heat results, and the chamber, in connection with the furnace, is highly heated.

The manner in which the air for effecting the combustion of the gaseous fuel in the hot-air flue or chamber $h$ is conveyed to the said chamber, and heated in its passage thereto, is as follows: The walls of the generators $a\,a$ are heated by the production of the gaseous fuel, and these heated walls are made use of to heat the air for mixing with the gaseous fuel formed in the said generators. The side walls $m\,m$ and the middle wall $n$, between the two generators, are reticulated or honey-combed, and the rear wall $p$ is also reticulated. These reticulations constitute tortuous ascending channels, through which the air passes, and is heated thereby.

The hot-air channels in the side and middle walls $m\,m\,n$ are marked $q$, and the shape of the said channels is best seen in the longitudinal section, Fig. 7. The channels or passages in the rear wall $p$ are marked $r\,r$, and their shape is best seen in Fig. 4.

Air from the ash-pits $d\,d$ enters the ascending channels $q\,q$ by the horizontal passages $s\,s$, opening into the ash-pits, (see Figs. 3 and 6,) and, similarly, air enters the rear ascending channels $r$ by the horizontal passages $t\,t$, just above the fire-bars, as seen in Fig. 6. The air traversing the end passages $r\,r$ enters by the passages $u$ into the upper part of the side passages $q\,q$, and the air heated by its passage through the reticulations $q\,q\,r\,r$ enters the hot-air flue or combustion-chamber $h$ by perforations at $v\,v\,w$ in the walls of the said flue or chamber $h$.

The heated air from the side passages $q\,q$ enters the hot-air flue $h$ at opposite ends, and the heated air from the middle passages $q\,q$ enters the hot-air flue at the middle thereof, as best seen in the horizontal section, Fig. 2.

The direction of the currents of hot air passing through the several ascending channels $q\,q\,r\,r$ into the hot-air flue or combustion-chamber $h$ is indicated by arrows; or, when the fire-bars of the combustion-chamber are tubular, their inner ends are made to project into the combustion-chamber $h$. The air passing through these tubular bars is heated thereby, and enters the chamber $h$, and mixes with and effects the combustion of the gaseous fuel.

Instead of heating the air supplied to the hot-air flue or combustion-chamber $h$, air may pass directly from the outside of the generators $a\,a$ by the lateral passages $x\,x$, Fig. 5, into the said flue or combustion-chamber $h$.

In order to increase the heat of the air supplied to the hot-air flue or combustion-chamber $h$, when the furnace is used in connection with a puddling-chamber, or other chamber where an intense heat is required, each of the gas-generators $a\,a$ is provided with a double arch, the space between the double arch forming a flue, through which the air, which has been heated by passing through the end ascending channels $r\,r$, is conducted, and is thereby further heated before it enters the hot-air flue $h$.

A furnace with these additional air-heating flues is represented in longitudinal section in Fig. 8 and transverse vertical section in Fig. 9, the section Fig. 9 being taken on the line G, Fig. 11. The arched flues between the closed tops of the generators $a\,a$ and the brick-work are marked 2 2. These arched flues 2 2 are in communication with the channels or passages $r\ r$ in the end walls of the generators by the inclined passages 3 3, and the said arched flues are in communication with the hot-air flue or combustion-chamber $h$ by the perforations 4 4 in the flue-wall $f$.

Having now described the nature of my invention, and the manner in which the same is to be performed, I wish it to be understood that I do not limit myself to the precise details herein described and illustrated, as the same may be varied without departing from the nature of my invention. At the same time I wish it understood that I do not, broadly, claim mixing the gaseous fuel and heated air before discharging them into the furnace to be heated; but

I claim as my invention of improvements in furnaces for metallurgical purposes, for heating steam-boilers, and for other heating purposes—

1. The combination of the generator or generators, in which the gaseous fuel is formed, with the hollow bridge $f\ g\ h$, forming one side of the generator or generators, and constituting a hot-air flue or combustion-chamber, in which the air is mixed with the gaseous fuel, and the combustion of the gaseous fuel is effected, said parts being constructed and arranged for joint operation substantially as and for the purposes described, and illustrated in the accompanying drawings.

2. In combination with the generator or generators and hot-air flue or combustion-chamber $f\ h\ g$, arranged for operation as described, the reticulated flues or channels in the walls of the generator or generators, for heating the air to be mixed with the gaseous fuel in the hot-air flue or combustion-chamber, substantially as and for the purpose described, and illustrated in the accompanying drawings.

3. In combination with the generator or generators and hot-air flue or combustion-chamber $f\ h\ g$, forming one side of the said generator or generators, as described, the flues in the walls of the generator or generators, and the arched flues above the said generator or generators, for increasing the heat of the air supplied to the hot-air flue or combustion-chamber, substantially as hereinbefore described, and illustrated in the accompanying drawings.

ALEXANDER PARKES. [L. S.]

Witnesses:
GEORGE SHAW,
RICHARD SKERRETT,
    *Of 37 Temple Street, Birmingham.*